(12) United States Patent
Kim et al.

(10) Patent No.: US 10,920,166 B2
(45) Date of Patent: Feb. 16, 2021

(54) COMPOSITE BEARING WITH ENHANCED WEAR AND MACHINABILITY

(71) Applicant: GGB, Inc., Thorofare, NJ (US)

(72) Inventors: Michael Kim, Thorofare, NJ (US); Jon Laicovsky, Thorofare, NJ (US); Kashta Rennie, Thorofare, NJ (US); Heitor Sarro, Thorofare, NJ (US); Andreas Trenkler, Thorofare, NJ (US)

(73) Assignee: GGB, Inc., Thorofare, NJ (US)

( * ) Notice: Subject to any disclaimer, the term of this patent is extended or adjusted under 35 U.S.C. 154(b) by 102 days.

(21) Appl. No.: 15/507,844

(22) PCT Filed: Sep. 4, 2015

(86) PCT No.: PCT/US2015/048598
§ 371 (c)(1),
(2) Date: Mar. 1, 2017

(87) PCT Pub. No.: WO2016/037087
PCT Pub. Date: Mar. 10, 2016

(65) Prior Publication Data
US 2017/0247631 A1     Aug. 31, 2017

Related U.S. Application Data

(60) Provisional application No. 62/046,789, filed on Sep. 5, 2014.

(51) Int. Cl.
*F16C 33/00* (2006.01)
*C10M 169/04* (2006.01)
(Continued)

(52) U.S. Cl.
CPC .......... *C10M 169/04* (2013.01); *B29C 70/00* (2013.01); *B29C 70/32* (2013.01); *C03C 25/465* (2018.01);
(Continued)

(58) Field of Classification Search
CPC ...... F16C 13/00; F16C 13/02; F16C 2208/00; F16C 2208/02; F16C 2208/12;
(Continued)

(56) References Cited

U.S. PATENT DOCUMENTS 2,953,418 A   9/1960   Runton et al.
3,533,668 A   10/1970  Tunis
(Continued)

FOREIGN PATENT DOCUMENTS

JP   2009103193 A   5/2009
WO   0008346 A1     2/2000

OTHER PUBLICATIONS

International Search Report and the Written Opinion of the International Searching Authority, or the Declaration for PCT/US2015/048598, issued by the International Searching Authority dated Nov. 27, 2015. 12 pages.
(Continued)

*Primary Examiner* — Matthew D Matzek
(74) *Attorney, Agent, or Firm* — Perkins Coie LLP

(57) ABSTRACT

A self-lubricating composite material is disclosed. The self-lubricating composite material can include discontinuous polymer fiber segments dispersed within a woven matrix of semi-continuous thermoplastic fiber. The woven matrix can be embedded within a thermosetting resin. Also disclosed are methods of manufacturing the self-lubricating composite material.

6 Claims, 1 Drawing Sheet

(51) Int. Cl.
*F16C 33/20* (2006.01)
*B29C 70/00* (2006.01)
*B29C 70/32* (2006.01)
*F16C 33/04* (2006.01)
*F16C 33/02* (2006.01)
*C03C 25/465* (2018.01)
*C08J 3/07* (2006.01)
*C08K 7/02* (2006.01)
*C08L 63/08* (2006.01)
*C10M 171/06* (2006.01)
*B29L 31/04* (2006.01)
*C10N 30/06* (2006.01)
*C10N 40/02* (2006.01)
*C10N 50/00* (2006.01)

(52) U.S. Cl.
CPC ............... *C08J 3/07* (2013.01); *C08K 7/02* (2013.01); *C08L 63/08* (2013.01); *C10M 169/044* (2013.01); *C10M 171/06* (2013.01); *F16C 33/00* (2013.01); *F16C 33/02* (2013.01); *F16C 33/04* (2013.01); *F16C 33/20* (2013.01); *F16C 33/201* (2013.01); *F16C 33/208* (2013.01); *B29L 2031/04* (2013.01); *C10M 2201/04* (2013.01); *C10M 2201/061* (2013.01); *C10M 2201/12* (2013.01); *C10M 2209/1013* (2013.01); *C10M 2213/062* (2013.01); *C10N 2030/06* (2013.01); *C10N 2040/02* (2013.01); *C10N 2050/14* (2020.05); *F16C 2208/00* (2013.01); *F16C 2208/02* (2013.01); *F16C 2208/04* (2013.01); *F16C 2208/32* (2013.01); *F16C 2208/86* (2013.01); *F16C 2220/28* (2013.01)

(58) Field of Classification Search
CPC .............. F16C 2208/20; F16C 2208/22; F16C 2208/30; F16C 2208/32; F16C 33/00; F16C 33/02; F16C 33/04; F16C 33/20; F16C 33/201; C08J 3/07; C08K 7/02; C08L 63/08
USPC ......... 384/300, 91, 129, 276, 297, 445, 908, 384/911; 264/210.7, 479, 288.4, 290.5, 264/291, 292; 442/97, 164, 269, 277, 442/340, 351, 414, 281
See application file for complete search history.

(56) References Cited

U.S. PATENT DOCUMENTS

| | | | |
|---|---|---|---|
| 3,560,065 A | 2/1971 | Joseph et al. | |
| 4,867,889 A | 9/1989 | Jacobson | |
| 5,631,085 A | 5/1997 | Gebauer | |
| 6,365,556 B1* | 4/2002 | Drew | C10M 149/12 384/299 |
| 2002/0155287 A1* | 10/2002 | Nelson | D02G 3/04 428/359 |
| 2004/0213492 A1* | 10/2004 | Kim | F16C 33/201 384/300 |

OTHER PUBLICATIONS

Extended European Search Report issued in EP Application No. 15838749.8 dated Apr. 4, 2018, 8 pages.

* cited by examiner

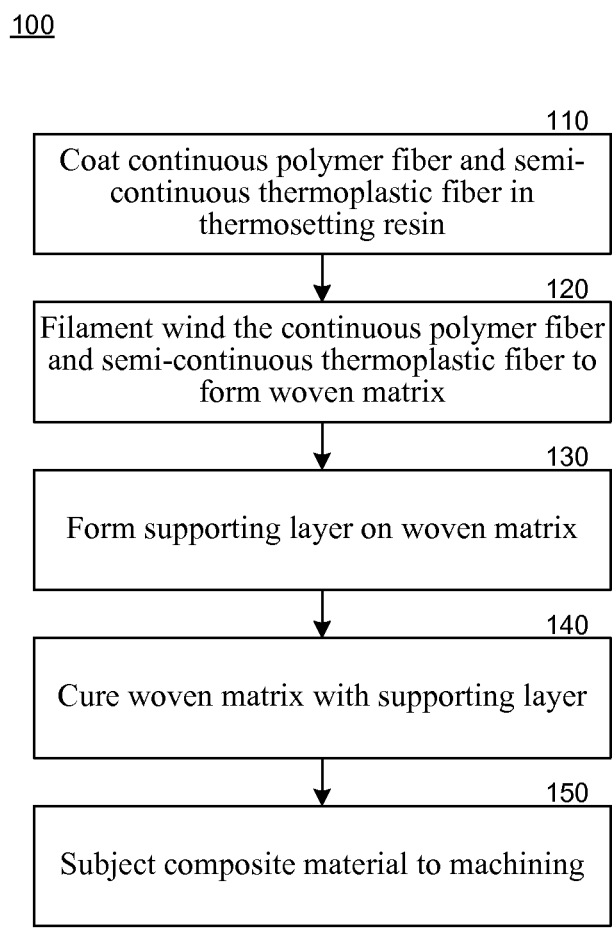

COMPOSITE BEARING WITH ENHANCED WEAR AND MACHINABILITY

BACKGROUND

Typical fiber wound composite bearings contain a relatively high content of continuous PTFE fibers as self-lubricants. These composite bearings can be used to provide low wear rates along with low friction levels in a variety of high load and aggressive industrial applications.

Bearing compositions including continuous PTFE fibers in a polyester/epoxy matrix have previously been disclosed. U.S. Pat. No. 4,867,889 describes the addition of carbon particles in an epoxy matrix having continuous PTFE fibers and polyester fibers embedded therein to enhance wear and friction performance in high load, large angle oscillation. European Patent No. 1616107B1 describes the addition of PTFE particulates to an epoxy matrix with continuous PTFE fibers and polyester fibers embedded therein to enhance performance in an oscillation mode of higher frequency, smaller angle oscillation than in U.S. Pat. No. 4,867,889. U.S. Published Application No. 2008/0160853 discloses a bearing composition using polyester fibers instead of continuous PTFE fibers, but includes PTFE particles worked into polyester fibers. As best understood from the '853 application, the PTFE particles have an aspect ratio of around 1.

In some applications, composite bearings require tighter dimensional tolerance than is possible or practical with composite bearings in their as-wound state. Typically, secondary operations, such as machining, are required in order to produce composite bearings meeting tight dimensional requirements. Unfortunately, the machinability of composite bearings having a high content of continuous PTFE fibers (such as in U.S. Pat. No. 4,867,889 and European Patent No. 1616107 discussed above) is typically poor. Machining composite bearings having a high content of continuous PTFE fiber tends to result in the breaking of PTFE fibers on the machined surface, which consequently leaves undesirable "fuzz" on the machined surface and deleterious voids in the surface previously occupied by PTFE fibers. Surface "fuzz" and the resulting voids can be undesirable because the resulting surface roughness can be greater than the entire desired dimensional tolerance range.

Accordingly, a need exists for a machinable self-lubricating composite material for use in composite bearings that has low wear rates and low friction over a broad range of application conditions.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

A self-lubricating composite material is disclosed herein that, in many embodiments, can be used in machinable self-lubricating composite bearings that are suitable for use in applications where a combination of large angle oscillation and low angle oscillation impart multiple requirements of wear resistance. The self-lubricating composite material generally includes discontinuous polymer fiber segments, semi-continuous thermoplastic fiber, and thermosetting resin.

In some embodiments, the discontinuous polymer fiber segments are dispersed throughout a woven matrix of semi-continuous thermoplastic fibers, and the semi-continuous thermoplastic fiber and discontinuous polymer fiber segments are embedded in the thermosetting resin. The discontinuous polymeric fiber segments can include PTFE fiber segments. The semi-continuous thermoplastic fiber can include polyester. The thermosetting resin can be an epoxy resin.

The thermosetting resin used in the composite material described herein also may include one or more additional self-lubricants. The additional self-lubricants can include from 1-10 wt % boron nitride (BN) particulates, from 5 to 15 wt % polytetrafluoroethylene (PTFE) particulates,—and from 5-20 wt % graphite particulates (wt % based on total weight of thermosetting resin and self lubricants).

Composite bearings and bushings can be made from the composite material disclosed herein using known filament winding techniques.

These and other aspects of the present invention will be apparent after consideration of the Detailed Description herein. It is to be understood, however, that the scope of the invention shall be determined by the claims as issued and not by whether given subject matter addresses any or all issues noted in the Background or includes any features or aspects recited in this

BRIEF DESCRIPTION OF THE DRAWINGS

FIG. 1 is a flow chart illustrating a method manufacturing a self-lubricating composite material according to various embodiments described herein.

DETAILED DESCRIPTION

The technology of the present application is described more fully below with reference to exemplary embodiments. These embodiments are disclosed in sufficient detail to enable those skilled in the art to practice the technology. However, the technology may be implemented in many different forms and should not be construed as being limited to the exemplary embodiments set forth herein. The following detailed description is, therefore, not to be taken in a limiting sense.

The term "continuous" as used herein (and/or in relevant prior art) indicates a fiber that was produced as a single structure with near-infinite aspect ratio.

The term "semi-continuous" as used herein applies to discreet fibers with a specific aspect ratio that are spun or otherwise combined to give the appearance and function of a continuous fiber.

"Discontinuous" fiber segments as used herein are considered to be elongated forms of matter, but still with a discrete and measurable aspect ratio (e.g., in the range of from 10 to 35).

The term "particulate" as used herein (and/or in relevant prior art) refers to discrete, isolated matter within the overall matrix, generally equiaxed in dimension, or possibly with a low aspect ratio (e.g., in the range of 1).

In some embodiments, the self-lubricating composite material generally includes discontinuous polymer fiber segments, semi-continuous thermoplastic fibers, and thermosetting resin. The semi-continuous thermoplastic fiber is woven into a matrix form, and the discontinuous polymer fiber segments are dispersed throughout the woven matrix of semi-continuous thermoplastic fibers. The woven matrix of semi-continuous thermoplastic fibers and discontinuous polymer fiber segments are embedded in a thermosetting resin.

In some embodiments, the total composite fibrous structure can include from 30 to 70 wt % discontinuous lubricating polymer fiber segments, from 20 to 40% semi continuous thermoplastic fiber, and 30 to 70 wt % thermosetting resin. Generally speaking, the discontinuous polymer fiber segments are evenly dispersed throughout the spun semi continuous thermoplastic fibers, and the lubricating particulate fillers are evenly distributed within the thermosetting resin.

The discontinuous polymer fiber segments included in the composite material may be made from any polymer fiber suitable for providing lubrication to composite materials used in bearings. In some embodiments, the polymer fiber is PTFE fiber. Another suitable polymer fiber includes polyester. The discontinuous polymer fiber segments serve as a lubricant in the composite material.

As noted above, the polymer fiber is present in the composite material in the form of discontinuous fiber segments. Each polymer fiber segment can have a length in the range of from 0.5 to 3.0 mm (e.g., 0.5 to 2.0 mm), a width in the range of from 50 to 120 µm (e.g., 60 to 100 µm), and a thickness in the range of from 10 to 30 µm (16 to 25 µm).

In some embodiments, the polymer fiber segments used in the composite material have an aspect ratio (ratio of length to width) of from 10 to 40. Fiber segments having an aspect ratio within this range are desirable because it allows the discontinuous fiber segments to be bound mechanically within the composite for retention as a wear resistant layer while also not being prone to breakage suffered by, e.g., continuous fibers, during machining. Mechanical retention of the discontinuous fiber segments is important since, generally speaking, the material of the polymer fibers used for lubrication in the composite bearing are not capable of forming strong chemical bonds with the thermosetting resin.

The thermoplastic fiber included in the composite material can be any suitable thermoplastic fiber for use in composite bearings. In some embodiments, the thermoplastic fiber is polyester. Other suitable thermoplastic materials include, but are not limited to aramid, polyamide, or other wear resistant polymeric fibers.

As noted above, the thermoplastic fiber of the composite material are semi-continuous thermoplastic fiber. As used herein, the term semi-continuous fiber means a plurality of discrete fiber pieces spun together to give the appearance and performance of a continuous structure.

The thermosetting resin used in the composite material can be any thermosetting resin suitable for use in a composite bearing. Useful thermosetting resins may include those that have high strength and low shrinkage during curing. In some embodiments, the thermosetting resin is an epoxy resin, a polyester resin, a vinyl ester resin, or a phenolic resin, with the preferred thermosetting resin being epoxy resin. Examples of commercially available epoxy resins suitable for use in the composite material include the EPON line of resins manufactured by Momentive Materials and 332 Liquid Epoxy manufactured by Dow Chemical. In some embodiments, the epoxy resin may comprise a polyether resin formed originally by the polymerization of bisphenol A and epichlorohydrin.

In some embodiments, the thermosetting resins used in the composite bearing material can be cured at temperatures greater than 165° C. (325° F.), and typically within the range of 190 to 200° C. (370 to 390° F.).

In the some embodiments, the thermosetting resin and semi continuous thermoplastic fiber are selected to ensure that the semi continuous thermoplastic fiber and the thermosetting resin form adhesive bonds with one another. The adhesive bond between the thermosetting resin and the semi continuous thermoplastic fiber provide the necessary mechanical support for the discontinuous polymer fiber segments to be maintained within the composite bearing.

The spun matrix of semi continuous thermoplastic fiber has discontinuous polymer fiber segments dispersed throughout, allowing for the discontinuous polymer fiber segments to be held in place despite an inability of the discontinuous polymer fiber segments to bond chemically with any supporting or binding structure, such as the thermosetting resin The thermosetting resin can include one or more additional self-lubricants. The compositional modification of the composite material through further addition of lubricating particulates (such as graphite, boron nitride of additional PTFE) assists in providing lubrication over a broad range of conditions, such as a combination of high load, large angle oscillation with higher frequency, low angle or small amplitude oscillation. The broad range of lubricating additives stabilizes the formation of a lubricating film (aka transfer film) under a broad range of sliding or oscillating conditions.

Any self-lubricants suitable for use in composite bearings and which provide low friction characteristics to products manufactured from the composite material can be used. In some embodiments, the self-lubricants used in the thermosetting resin include boron nitride (BN) particulates, polytetrafluoroethylene (PTFE) particulates, and graphite particulates. Particulates as used herein refer to material having as aspect ratio around 1.

In some embodiments, the thermosetting resin includes from 1 to 10 wt % boron nitride particulates (wt % based on total weight of thermosetting resin and self-lubricants). The size of the BN particulates used in the thermosetting resin can be within the range of from 1 to 37 µm, with an average size of 9 µm. An example of a commercially available BN particulate that can be used in the embodiments described herein is Momentive NX9, manufactured by Momentive Performance Materials, Inc.

In some embodiments, the thermosetting resin includes from 5 to 15 wt % PTFE particulates (wt % based on total weight of thermosetting resin and self-lubricants). The PTFE particulates will typically be present in the thermosetting resin in clusters of multiple individual particulates. The size of the PTFE particulate clusters used in the thermosetting resin can be within the range of from 400 to 650 µm, such as 490 µm. In some embodiments, the processing of these PTFE particulates clusters may be conducted to disassociate the agglomerated particles into smaller clusters, such as clusters in the range of 10 to 150 µm diameter. An example of a commercially available PTFE particulate that can be used in the embodiments described herein is Teflon PTFE 62, manufactured by Dupont.

In some embodiments, the thermosetting resin includes from 5 to 20 wt % graphite particulates. Exemplary graphite particulate suitable for use in the thermosetting resin includes F-288 from Asbury Carbons.

Any suitable manner of preparing a thermosetting resin having self-lubricants dispersed therein can be used. In some embodiments, the self-lubricant particulates are mixed with the thermosetting resin in an industrial mixer for a suitable time period so as to cause the self-lubricant particulates to be generally evenly dispersed throughout the thermosetting resin. The self-lubricant can be added into the thermosetting resin all at once, or gradually as the mixing is carried out. Another preferred embodiment pre-mixes the PTFE and graphite with liquid hardener and wetting agent to help de-agglomerate the PTFE particulates. Boron nitride and thermosetting resin are added last and mixed to an appropriate consistency.

With reference to FIG. 1, the process 100 of manufacturing the composite material generally includes a step 110 of coating continuous polymer fibers and semi continuous thermoplastic fibers in the thermosetting resin, followed by a step 120 of winding the coated continuous polymer fibers and the coated semi continuous thermoplastic fibers around a supporting mandrel using a filament winding technique. In some embodiments, the continuous polymer fiber and the semi continuous thermoplastic fiber are on separate spools and are simultaneously wound onto a mandrel.

The polymer fiber used in the initial steps of forming the composite material are continuous polymer fibers, meaning the fiber is a single strand of material with no breaks along the length of the fiber. As discussed herein, the continuous polymer fiber eventually breaks into individual discontinuous fiber segments during the manufacturing steps. The thermoplastic fiber used in the initial steps of forming the composite material are discontinuous thermoplastic fibers, meaning that the fiber appears to be continuous unless viewed, e.g., under a microscope, at which point it can be seen that the fiber is actually made of numerous discrete lengths of thermoplastic fiber wound together to form a longer fiber length.

The spinning action of the filament winding technique results in the continuous polymer fibers being "stretch broken." The result is a plurality of discrete short polymer fiber segments dispersed amongst the woven continuous thermoplastic fiber matrix, and the entire woven structure being coated in the thermosetting resin matrix. The discrete fiber segments are sufficient to impart wear and friction performance comparable to continuous polymer fibers while also providing favorable machining response in comparison to composite materials having continuous polymer fibers embedded in a thermosetting matrix.

In step 110, the continuous polymer fiber and semi-continuous thermoplastic fiber are coated with thermosetting resin. In some embodiments, the continuous polymer fiber and semi-continuous thermoplastic fiber are coated with thermosetting resin by dipping the continuous and semi-continuous fibers in the thermosetting resin prior to conducting the filament winding step. In some embodiments, the continuous and semi-continuous fibers are continuously drawn through a bath of the thermosetting resin in order to coat the continuous and semi-continuous fibers. Other batch-like techniques for coating the continuous and semi-continuous fibers can be used, such as immersing individual continuous or semi-continuous fiber threads into a bath of the thermosetting resin.

After the coating step, a step 120 of filament winding the coated fibers is carried out. The thermosetting resin-coated continuous polymer fibers and the thermosetting resin-coated semi-continuous thermoplastic fibers are filament wound onto a supporting mandrel to form a woven structure on the mandrel. Generally speaking, any filament winding techniques known to those of ordinary skill in the art can be used to prepare composite bearings from the composite material described herein. Filament winding techniques can impart a significant level of cross-hatch in the fibrous structure of the composite bearing, which can improve the machinability and self-lubricating wear properties of the composite bearing. This also creates spaces within the fibrous matrix to hold lubricating particulates.

As noted previously, the filament winding step results in the continuous polymer fiber being stretch broken into discontinuous polymer fiber segments, while the semi-continuous thermoplastic fibers remain intact. As a result of the filament winding step and the stretch breaking of the continuous polymer fibers, a woven structure of semi-continuous thermoplastic fibers with discontinuous polymer fiber segments dispersed throughout the woven structure is formed.

The thickness of the woven matrix on the supporting mandrel is generally not limited. In some embodiments, the woven matrix is wound on the mandrel up to a thickness of between 0.3 and 5 mm.

The supporting mandrel can be of any size of shape desired and can be made from any suitable supporting material. In some embodiments, the material of the supporting mandrel is steel or aluminum. Typical shapes for the mandrel include hollow cylinders.

After the thermosetting resin-coated fibers have been wound on the supporting mandrel, a step 130 of forming a supporting layer over the woven matrix can be carried out. This forms a supporting backing that serves as a high strength matrix to support the composite material at high bearing loads (e.g., up to or exceeding 420 MPa).

The supporting layer can be formed using any material suitable for providing strength to the woven composite material. In some embodiments, the supporting layer is formed from fiberglass. Other suitable materials that can be used include, but are not limited to continuous, filament wound polyester or aramid fibers. In some embodiments, the supporting layer may comprise a suitable metal backing or housing, and woven matrix can be affixed to the supporting layer using an adhesive. Further examples of potentially suitable materials for use to construct the supporting layer are glass/epoxy, glass/polyester, glass/phenolic, linen/phenolic and cotton/phenolic.

In some embodiments, the supporting layer can be formed over the woven composite material using generally the same method as described above for winding the fibers on the supporting mandrel. The selected supporting layer material (e.g., fiberglass) is first coated with the same thermosetting resin used to coat the fibers. The coated supporting layer material is then wound over the top of the composite material using a filament winding technique. In some embodiments, the thickness of the supporting layer can be in the range of from 1 mm to 50 mm.

The method 100 can also include a curing step 140. After application of the supporting layer is completed, the mandrel with the composite material and supporting layer formed thereon is removed from the winding machine and placed into a furnace for curing of the thermosetting resin. Curing can be carried out in any suitable manner, including heating the composite material and supporting layer to a temperature in the range of approximately 190 to 200° C. (370 to 390° F.) in a curing oven. The curing can be carried out for any suitable period of time needed to harden the thermosetting resin, such as for a period of time from 30 minutes to 6 hours.

Once cured and hardened, the composite material can be removed from the supporting mandrel to provide a composite material with a supporting layer generally having the shape of the supporting mandrel. The composite material removed from the supporting mandrel can include a thermosetting resin/semi-continuous thermopolymer fiber/discontinuous polymer fiber segment inner lining and a supporting backing layer made of, e.g., fiberglass.

The composite bearing produced from the composite material can be subjected to various additional processing steps 150, such as grinding or machining of the supporting outer surface and machining by conventional single point machining methods of the inner surface. Due to the absence of continuous polymer fibers, the composite bearing can be machined with little to no creation of "fuzz" and accompanying deleterious voids on the machined surfaces. This is because polymer fiber segments used in the embodiments described herein do not break and create fuzz when subjected to machining in the same manner as continuous polymer fibers. The polymer fiber segments do not break during machining because the adhesive bonding between the discontinuous thermoplastic fiber and the thermosetting resin provide mechanical encapsulation of the discontinuous polymer fiber segments.

Test Results:

The benefits of composite bearing formed from the composite material described herein were demonstrated in the following tribological tests and through a machining study to demonstrate the value of the discontinuous fibers.

1. High Load, Large Angle Oscillation:
Load: 70 MPa
Oscillation angle: +/−30°
Oscillation speed: 15 cyc/min
Size: 25.4 mm shaft 2. Short Angle, High Frequency Oscillation:
Load: 30 Mpa
Oscillation angle: +/−5°
Oscillation speed: 200 cyc/min
Size: 25.4 mm shaft Composite Bearing 1: Filament wound composite bearing made from composite material described herein.

Composite Bearing 2: Filament wound composite bearing made from materil containing high percentage of continuous? PTFE fibers and PTFE particulates and fiberglass backing (not machinable/boreable via "standard" machining methods).

Composite Bearing 3: Filament wound composite bearing made from material containing continuous? Polyester fibers, PTFE particulates and fiberglass backing.

Composite Bearing 4: Homogenous composite bearing made from phenolic-based material manufactured from a fiber mesh.

| Wear rate/condition | 70 Mpa +/−30° oscillation 25.4 mm diameter 15 cyc/min | 30 Mpa +/−5° oscillation 25.4 mm diameter 200 cyc/min |
| --- | --- | --- |
| Composite Bearing 1 | 6.4 μm/km | 3.2 μm/km |
| Composite Bearing 2 | 16.4 μm/km | 3.8 μm/km |
| Composite Bearing 3 | 110 μm/km | 22 μm/km |
| Composite Bearing 4 | 795 μm/km | no data |

The data above shows that Composite Bearing 1 (i.e., the composite bearing made from the composite material described herein) demonstrated the most favorable wear resistance of all tested. In addition to superior wear performance, Bearing 1 demonstrated favorable machining response in comparison to Bearing 2, manufactured with continuous PTFE fibers.

Machining response was evaluated through measurement of surface roughness after machining. The study compared discontinuous PTFE fiber construction with continuous PTFE fiber construction (Bearing 2). Machining conditions were as follows:
Diameter: 125 mm
Tool type: carbide
Speed: 360 rpm
Travel: 0.125 mm/revolution
Cut depth: progressive cuts: 0.425, 0.300, 0.100 mm on diameter
Roughness (Ra) after machining:
Bearing 1: 2.6 um
Bearing 2: 5.3 um

We claim:

1. A self-lubricating composite material comprising:
a woven matrix of semi-continuous thermoplastic fibers;
discontinuous polymer fiber segments dispersed throughout the woven matrix, wherein each discontinuous polymer fiber segment has a length in the range of from 0.5 mm to 3.0 mm and, wherein:
the discontinuous polymer fiber segments are formed by:
winding a continuous polymer fiber onto a supporting mandrel, and
stretch breaking the continuous polymer fiber, which was wound onto the supporting mandrel, to form the discontinuous polymer fiber segments; and
a thermosetting resin in which the woven matrix is embedded.

2. The material of claim 1, wherein the semi-continuous thermoplastic fiber comprises polyester.

3. The material of claim 1, wherein the discontinuous polymer fiber segments comprise PTFE.

4. The material of claim 1, wherein the thermosetting resin comprises an epoxy resin.

5. The material of claim 4, wherein the epoxy resin further comprises one or more self-lubricants selected from the group consisting of boron nitride particulates, PTFE particulates, and graphite particulates.

6. The material of claim 1, wherein each discontinuous polymer fiber segment has an aspect ratio in the range of from 10 to 40.

* * * * *